J. F. D. HOGE.
MULTIPLEX TELEGRAPH SYSTEM.
APPLICATION FILED APR. 11, 1910.

1,078,284.

Patented Nov. 11, 1913.
6 SHEETS—SHEET 1.

Fig. 1.

Witnesses:
Max B. A. Doring
May I. Trimble

Inventor
Joseph F. D. Hoge
By his Attorney
H. M. Marble

J. F. D. HOGE.
MULTIPLEX TELEGRAPH SYSTEM.
APPLICATION FILED APR. 11, 1910.

1,078,284.

Patented Nov. 11, 1913.
6 SHEETS—SHEET 2.

Fig. 2.

Attest:
Max J. Trumble
Paul H. Frank by

Inventor:
Joseph F. D. Hoge
H. M. Marble
Atty

J. F. D. HOGE.
MULTIPLEX TELEGRAPH SYSTEM.
APPLICATION FILED APR. 11, 1910.

1,078,284. Patented Nov. 11, 1913.
6 SHEETS—SHEET 4.

UNITED STATES PATENT OFFICE.

JOSEPH F. D. HOGE, OF NEW YORK, N. Y., ASSIGNOR TO AMERICAN DISTRICT TELEGRAPH COMPANY, A CORPORATION OF NEW JERSEY.

MULTIPLEX-TELEGRAPH SYSTEM.

1,078,284.

Specification of Letters Patent.   Patented Nov. 11, 1913.

Application filed April 11, 1910.   Serial No. 554,668.

*To all whom it may concern:*

Be it known that I, JOSEPH F. D. HOGE, a citizen of the United States, residing at New York, in the county of New York and State of New York, have invented a certain new and useful Multiplex-Telegraph System, of which the following is a specification.

My invention relates to improvements in multiplex telegraph systems, and particularly in call-box signaling systems, such as district messenger systems, watchman's systems, fire alarm systems, etc.

I will particularly describe herein my invention, as applied to district messenger systems and like signaling systems involving the use of call boxes (it being understood that fire alarm boxes and other like automatic telegraph transmitters are in a general sense, the equivalent, in a system such as herein described, of district messenger call boxes) and will then point out certain applications of my invention in connection with ordinary telegraphy.

In district messenger systems, fire alarm systems, and the like, it is customary to provide a number of call boxes in a single circuit, these boxes adapted each to transmit a signal (usually a number) different from the signals of the other boxes in the same circuit, suitable receiving devices being located at what for convenience may be termed a "central station". In practice there are a number of such circuits leading to the same central station, and the call boxes or transmitting devices of each circuit are usually somewhat close together. There is a practical limit to the number of boxes that may be placed in any one circuit, and give good service, this number varying more or less according to local conditions, but since in general any such system will comprise circuit conductors of considerable length leading from the central station to the vicinity where the boxes are located, a considerable economy may be effected if these same conductors may be used for transmitting the signals of an entirely distinct group of boxes, provided no interference between the signals of the different groups of boxes results. This I accomplish according to my present invention. I arrange to impose upon the same circuit conductors two distinct currents, one a direct current, the other an alternating current of somewhat high frequency, and I provide two groups of call boxes, one arranged to affect the direct current, the other to affect the alternating current; and I provide two distinct receiving devices, one for the direct current signals, the other for the alternating current signals. Between the direct current boxes and the line conductors, and between the direct current receiving devices and the line conductors, I provide means for preventing these instruments from being affected by, or from affecting, the alternating current; and between the alternating current boxes and the line conductors and the alternating current receiving devices and the line conductors, I interpose means for preventing such devices from being affected by, or affecting, the direct currents. The direct current transmitting and receiving devices are already well known in the art. The branch circuits by which I impose upon these ordinary circuits the alternating current transmitting and receiving devices, I term, for the sake of a name, "phantom" circuits. In like manner I may impose two or more alternating currents upon the same circuit, with or without an additional direct current, as desired; the alternating currents being of different frequencies; and I separate the alternating currents one from another, operatively, by employing suitable condensers and inductance coils.

My invention therefore comprises a plurality of signaling systems, employing the same line conductors, one or more of said systems operating by means of alternating currents, together with means for isolating the several systems, each from all of the others; also a plurality of signaling systems employing the same line conductors, one of said systems operating by direct current, the other or others by alternating currents, together with means for isolating the several systems each from all the others; also various other features hereinafter described and pointed out in the appended claims.

The isolation of the several systems employing the same line conductors, according to my invention, depends (first) on the fact that an inductance coil can be constructed which for any given conditions will limit the passage of an alternating current through it to any desired value, however small, (though in practice such inductance coil cannot be made to actually exclude the alternating current altogether, but can be made to limit it to such value that it does not cause disturbance of the instruments); (second) on the fact that a condenser and an inductance coil placed in series in a circuit, may have the values of their capacity and inductance, respectively, so chosen, that they will have a very small impedance to an alternating current of a given frequency, but will offer a great impedance to one of a higher or lower frequency, the condenser being effective principally to exclude currents of lower frequency, the inductance coil being principally effective to exclude currents of higher frequency, so that it is possible to limit the passage of a second alternating current of different frequency to any given value, however small, even though in practice it be impossible to exclude such second alternating current altogether, though possible to reduce it to such value that it does not produce material disturbance.

In essential principle, the exclusion of a direct current from the alternating current system or systems, is somewhat similar to excluding an alternating current of lower frequency from systems in which alternating currents of higher frequency are used, for while a condenser will pass no current for a constant direct potential after once charged, a pulsating direct current will give rise to an alternating current through the condenser, the condenser accepting current in one direction to charge it as the potential rises, and passing it in the opposite direction by discharging as the potential falls.

The objects of my invention are to increase the service capacity of telegraph, alarm, and other signaling circuits and the like, without detriment to the service given, to avoid conflict between the several superimposed signaling systems, to make the apparatus required simple, easily understood, easily adjusted, and relatively inexpensive, to make the complete system operate correctly either over a metallic circuit or over ground return circuits, and to provide for the conversion at will of a metallic circuit system into two independent ground return systems, and vice versa, and to make the system as a whole operative with currents of low potential and with instruments of a simple and relatively inexpensive type.

I will now proceed to describe my invention with reference to the accompanying drawings, illustrating more or less diagrammatically different arrangements of circuits and instruments embodying my invention.

In said drawings

Figure 1:
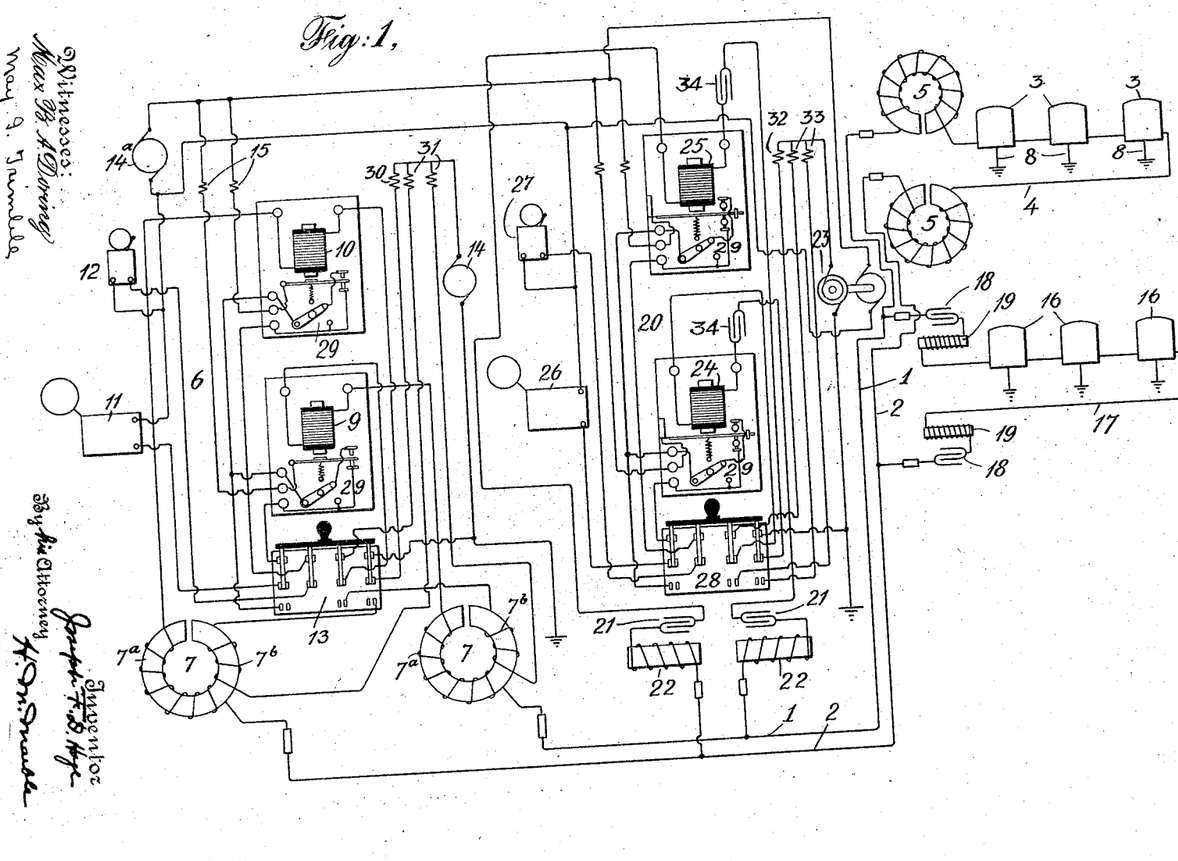
Figure 1 shows diagrammatically a call box system comprising a direct current side and an alternating current side, using the same line conductors and operating normally through a metallic circuit but adapted at will to be changed into two separate systems comprising each a line conductor and a ground return.

Referring now to the drawings, and at first to Fig. 1, 1 and 2 designate line conductors, serving both for the primary signaling circuit and for the "phantom" circuit, before referred to.

3, 3 designate ordinary call boxes, i. e., signal transmitters, in a primary circuit 4 connected to the line conductors 1 and 2 through inductive resistances 5; and 6 designates a corresponding direct current receiving set, at a central station, connected to line conductors 1 and 2 through inductive resistances 7. The call boxes 3 are to be understood to be of any well known type and for ordinary call, signal, or alarm service are preferably arranged to work according to the well-known McCulloh system, each having, as is customary in such boxes, two signal wheels of similar signal numbers, one arranged to work through the metallic circuit, the other to work through a ground return, each such box having a ground connection 8. The receiving set 6 is of the general nature of such sets as commonly employed in district telegraph work, comprising receiving relays 9 and 10, (in this system usually having resistance of from 600 to 1000 ohms) a receiving register 11, and a further receiving device 12, also a double-throw multi-pole switch 13, commonly termed a McCulloh switch in a system such as this, by which the circuit comprising conductors 1 and 2 may be converted, at will, into two separate ground-return circuits, according to the well-known McCulloh system. The general arrangement of the instrument of the receiving set 6, shown in the drawings, is that of the patent to Hamblin No. 808,451, dated Dec. 26, 1905.

14 designates a direct-current generator, 14ᵃ another direct-current generator supplying current to the local circuit of receiving sets 6 and 20, and 15, 15 suitable non-inductive resistances of from 250 to 300 ohms—in any case, a resistance high enough to make resistance, rather than inductance, the controlling factor in the local circuits of the direct-current receiving set 6. Otherwise, the inductance of the local direct-current receiving apparatus would delay the current rise and fall and so prevent it responding to impulses of short duration in the desired manner.

16, 16 designate call boxes similar to boxes 3, but located in a "phantom" circuit 17 connected to conductors 1 and 2 respectively, through condensers 18 and inductive resistances 19.

20 is a receiving set, for boxes 16, arranged to be operated by alternating currents of relatively high frequency, and connected to conductors 1 and 2 through condensers 21 and inductive resistances 22.

23 designates an alternating current generator for supplying current to receiving set 20 and boxes 16. Receiving set 20 is in general the same as set 6, comprising relays 24 and 25, a register 26, another signal receiving device 27, and a double-throw multi-pole McCulloh switch 28, by which the "phantom" circuit 17, the current of which is superimposed upon the direct current of circuit 4 flowing through conductors 1 and 2, may be converted, at will, into two separate ground-return circuits, according to the well-known McCulloh system.

It is found practically nearly impossible to work ordinary direct-current relays on alternating currents of the frequencies which I propose to use in this system, without employing special adapting means, as hereinafter described, since such relays, if operated by such currents, do not produce sufficiently good contacts between their armatures and front contact points, owing to the constant alternate magnetization and demagnetization of their magnets and the constant pull upon their armatures of the customary armature retractile springs; hence I preferably employ, for relays 24 and 25, relays of the special type hereinafter described and illustrated in Figs. 4-9 inclusive, which can be adjusted to be operated by an alternating current of definite frequency, as positively as an ordinary line relay can be operated by ordinary direct current.

Relays 9, 10, 24 and 25, are provided with the hand switches usually provided in relays of the McCulloh type, and described in the Hamblin patent referred to, for use in changing from metallic circuit to independent ground-return circuits. The use and effect of such switches being described in said patent, in connection with switches corresponding to switches 13 and 28 herein, need not be described here.

Since inductive resistances, such as coils 5 and 7, offer only ohmic resistance to direct currents, but offer very much greater resistance to alternating and pulsatory currents, and since condensers, such as 18 and 21, are "opaque" to direct current, but "transparent" to alternating currents, it is practicable, by employing inductive resistances 5 and 7 of sufficient retardation, and by employing condensers 18 and 21, to completely isolate, operatively, the primary or direct-current circuit, 4, and its receiving set 6, from the "phantom" circuit 17, and its receiving set, 20, notwithstanding that both circuits and both receiving sets use the same line conductors 1, 2 and ground.

In Fig. 1 the switches 13 and 28 are indicated as in the position for normal working, that is to say, for working with a complete metallic circuit. In this art it is customary to speak of such a system as working "normally" when working on a complete metallic circuit, and to speak of the system as working as a McCulloh system, or, as the phrase is, "working McCulloh", when the system is working with ground return circuits.

A large non-inductive resistance 30 (say a resistance of about 7000 ohms) is provided in the main circuit in order that the impedance of the line may be composed largely of resistance, the resistance of the line itself, in a system such as illustrated herein, being usually not greater than 1000 ohms. This enables the line relays to keep pace with rapid signals, and as the values of the line current are small, this resistance does not involve detrimental loss of power. If this same resistance 30 were in the line when, by the operation of the switch 13, the direct current system is caused to operate as a McCulloh system, a practical difficulty would be presented, since in such case the two ground return circuits of the direct current system, produced by reversing the switch 13 from the position shown in Fig. 1, would each contain less resistance than the metallic circuit used in normal operation, for the metallic circuit contains both relays 9 and 10, each of large resistance, whereas the two ground return circuits, when the system is operating as a McCulloh system, each contains but one of these relays. This change of resistance, when converting the direct current system into two ground return circuits, if not counteracted, would cause the working current to change greatly when changing the system from normal working to McCulloh working, or vice versa, and so might give rise to various troubles. To obviate this difficulty I provide special non-inductive resistances 31, one for each such ground return circuit, which are of higher value than resistance 30, to compensate for the exclusion of one of the relays 9 and 10 from each ground return circuit; and I provide circuits, and on switch 13 contacts therefor whereby resistance 30 is in the line circuit during normal working, and one of these resistances 31 is in one ground return circuit, and the other resistance 31 is in the other ground return circuit, in McCulloh working. The circuits controlled by switch 13, by which resistance 30 is thrown out and resistances 31 thrown in, when changed from normal to McCulloh working, will be readily seen in Fig. 1. In practice these resistances 31 are of about 9000 ohms each; (it being understood that the values for resistance, referred to throughout this specification, are approximate, and are subject to variation in accordance with different operating conditions). On the alternating current side of the receiving apparatus, a similar arrangement of resistances is employed, the normal resistance 32 being arranged to be thrown out of circuit when the switch 28 is shifted for McCulloh working, and other somewhat greater resistances 33 being included, one in each of the ground return circuits thereby produced.

In order to compensate for the decrease in inductance in each ground return circuit, as compared with the inductance in the metallic circuit, due to the exclusion of one or the other of relays 9 and 10 from each ground return circuit of the direct current system, the inductance coils 7 at the receiving end of the direct current system are so arranged that an additional inductive value is added to each coil when the system is operating as two ground return circuits. This is accomplished by providing the coils 7 with separate windings, $7^a$ and $7^b$, of which the two windings $7^a$ only are in circuit in normal or metallic return working, but when switch 13 is shifted for McCulloh working, windings $7^b$ are thrown into these circuits by the switch 13, each ground return circuit then including one winding $7^a$ and one winding $7^b$ connected in series. This arrangement obviates the greater leakage of alternating current through the direct current side which would otherwise occur during McCulloh working, without increasing the inductance of the direct current system during normal working.

As fully explained in the Hamblin patent referred to, in case the circuit 4 should be broken but not grounded, at the instant of break the armatures of relays 9 and 10 will drop and the signal receiving devices 11 and 12 will run continuously instead of intermittently, as in normal operation. The same will be true if a break should occur in one of conductors 1 and 2; and in such case the attendant will reverse the switch 13, which has the effect of dividing the circuit of the direct current system into two independent ground return circuits, of which one is served by relay 9 and register 11 and the other is served by relay 10 and register 11. In like manner, should a break without ground occur in the phantom circuit 17, the armatures of relays 24 and 25 will drop and signal receiving devices 26 and 27 will operate continuously instead of intermittently as in normal operation; and thereupon the attendant will reverse switch 28, which has the effect of converting the phantom circuit or alternating current system into two independent ground return circuits. Should the break occur in conductor 1 or conductor 2, the armatures of all the relays 9, 10, 24 and 25 will drop, and the attendant will reverse both switches 13 and 28. Should a ground occur in the circuit 4 or in the circuit 17, this is evidenced at the central station by the operation of the signal receiving device 12 (in case circuit 4 is grounded) or by the operation of receiving device 27 (in case circuit 17 is grounded) and thereupon the attendant will not only reverse switch 13 or switch 28 as the case may be, but will also reverse the so-called "McCulloh" switches 29 on the relays 9 and 10, or 24 and 25, as the case may be, so that said relays then work through their back contacts instead of through their front contacts as formerly. If the ground should occur in one of conductors 1 or 2, the operator will reverse both switches 13 and 28 and all of the McCulloh switches 29.

The following is a statement of the relative proportions, as to resistance, inductance, etc., of the various parts of a system such as shown in Fig. 1, which has been found to work satisfactorily: On the direct current side relays 9 and 10 are each of about 1000 ohms. The line non-inductive resistance 30 employed in normal working is of about 7000 ohms and the line non-inductive resistances 31 employed in ground return or McCulloh working are each of about 9000 ohms. The winding $7^a$ of the inductive resistances at the receiving end of the line are such as to develop an electromotive force of 450 volts when passing 2.5 milliamperes at 240 cycles per second. The windings $7^b$ are of such value that when the direct current side is working as two ground return circuits, the total inductance in each circuit is increased to about twice the inductance used in normal working, the inductance being then such as to develop 450 volts when passing about 1.25 milliamperes at 240 cycles. The coils 5 at the transmitting end of the direct current system, are proportioned to develop each an inductive electromotive force of 450 volts when passing 2.5 milliamperes at 240 cycles per second. The inductive resistances 7ª—7ᵇ and 5 are designed with a view to developing the same inductive voltage for a given alternating current, entirely independent of whether the direct current of the direct current side is passing through the same windings or not, as otherwise a considerable interference between the direct current and alternating current side would be observed. These coils are therefore designed to operate at relatively low flux densities; the flux densities being held down by the introduction of an air gap in the magnetic circuit, as shown. This holds the permeability of the magnetic circuit practically constant. As a result the inductive values given above are practically independent of the passage of direct current through the coils up to the value of 20 milliamperes, which is much above the working value of the direct current used in the system described (such working value being say about 8 milliamperes). These coils 7ª—7ᵇ and 5 must have such value that on the one hand, they will reduce to a negligible value the leakage of alternating current to the direct current side, and on the other hand, they will not introduce into the direct current side so great inductance as to too greatly retard the rapid current changes met with in direct current signaling. The coils of the values above given meet this condition, and there is considerable leeway—that is to say, the coils may have considerably less or considerably greater inductance and still permit successful operation.

On the alternating current side, the line resistance 32 used in normal working, is usually of about 3100 ohms resistance, and the resistances 33 used in McCulloh working are usually of about 7600 ohms. The condensers 18 and 21 on the alternating side are necessarily small, their maximum value being determined by the leakage current due to the pulsating direct current potential imposed upon them by the operation of the direct current side of the system. The minimum value of these condensers is dictated by the high potential required to force alternating current through condensers of low value. Each of these alternating current line condensers has a value of .03 micro-farad, and develops an electromotive force of 308 volts when passing a current of 20 milliamperes at 240 cycles per second. Condensers 21 are each used in connection with an adjustable inductance coil 22 which reduces the electromotive force to 16 volts when passing 20 milliamperes at 240 cycles per second. Condensers 18 are each used in connection with an adjustable inductance coil 19 adapted to develop an inductive electromotive force of from 316 to 440 volts when passing 20 milliamperes at 240 cycles per second, the inductive value of these coils depending upon the position of their sliding cores. It is found in practice, necessary to adjust the inductance coils 19 to their particular condensers and line conditions, when first installing the system. In general, no further adjustment of these inductance coils 19 is required except in case the corresponding condenser 18 should be replaced by a new condenser. The relays 24 and 25 on the alternating current side have a resistance each of about 180 ohms and their coils have such inductance as to develop about 80 volts when passing 20 milliamperes at 240 cycles per second. The condensers 34 used in series with these relays are of from .15 to .2 microfarads, the effect of such condensers being to reduce the combined potential to about 55 volts when passing the current above mentioned.

The direct current used to operate the direct current side of the system, and derived from generator 14, is a 110 volt current, reduced by the resistances mentioned to about 24 volts across the line wires 1 and 2 where these wires leave the receiving station, and when the circuit is closed. The working current is about 8 milliamperes both on normal and McCulloh working.

The alternating current used to operate the alternating current side of the system, has, as above stated, a frequency of 240 cycles per second, and a voltage at the generator of about 250; reduced to about 50 volts across the line wires where they leave the station on closed circuit. The working current on the alternating current side is 20 milliamperes both on normal and McCulloh working.

Preferably the alternating current generator 23 should be driven at very constant speed, as the effect of change of speed is of course to change the frequency of the alternating current, and as has been explained heretofore, the various parts of the system are adjusted with respect to a definite frequency of alternating current. When, as is ordinarily the case, the alternating current generator 23 is part of a motor generator set, being driven by a direct current motor, this set should be designed for constant speed, and should normally operate with its field magnet working at saturation, as otherwise slight changes in the voltage of the direct current driving the motor generator set, will produce changes in speed of the set. To further reduce the probability of slight changes in speed, the rotating parts of the set are customarily designed so as to have a considerable inertia effect, so obviating changes of speed due to rapid changes in load. The generator 23 should be of such design as to give an electromotive force wave that is substantially sine in form and which does not material change its form for changes in load. The generator field should be run at constant excitation, as otherwise it is likely to disturb both the speed and wave form of the generator.

Referring now to Figs. 4–7 inclusive, showing a special type of relay which I have found particularly effective for use on alternating currents, 35 designates a horseshoe electro-magnet such as is commonly used in relays, provided with the usual adjusting device 36 for moving the magnet toward and from the armature. The armature of this relay consists of a steel rod 37, of such weight, stiffness, and resilience that it may vibrate in harmony with the alternations in the current energizing magnet 35. This armature is supported, at one end, by thin flexible strips 38, adjustably secured in clamps 39 of a rigid support 40. The relay is provided with front and rear stops, 41 and 42, of which both, in the construction shown, are contact stops. Beyond these stops the armature is provided with a weight, 43, for regulating the period of normal vibration of the armature, such weight being, preferably, adjustable upon the armature, for which purpose the end portion of the armature is screw-threaded and the weight is arranged to screw back and forth on this portion of the armature, and is provided with a set screw 44, to hold it in any position to which it may be adjusted. The purpose of so adjusting the weight is to vary the normal rate of vibration of the armature, when necessary, to correspond with the rate of vibration imposed on the armature by the alternating current energizing the relay magnet; and when such adjustment has been effected the front stop, 41, will be at one of the nodes or stationary points of the armature during the vibration, and so contact between the armature and such stop will not be affected by the vibration of the armature. This adjustment may be effected with great accuracy, because so long as the adjustment is not practically perfect a buzzing noise will be produced by the action of the armature on the front stop 41 while the alternating current is passing through the coils of the magnet, also a voltmeter, placed in a circuit passing through the armature and front stop 41 and provided with a source of current, will show far less than the proper strength of current flowing through such circuit; and as the adjustment of the weight more nearly approaches what it should be, the buzzing noise decreases and the voltmeter shows rise in current, until finally, when the correct adjustment has been reached, the buzzing noise ceases completely, and the voltmeter shows full current strength, the contact then obtained being as perfect as in an ordinary relay operating on direct current. In extreme cases it may be necessary, for purposes of adjustment, to loosen the clamps 39 and adjust the length of the strips 38 between said clamps and the armature itself; but in the case of a relay once properly adjusted by the maker, adjustment of the length of the strips 38 for slight variation in frequency of the energizing current of the relay is not required.

Figure 5:
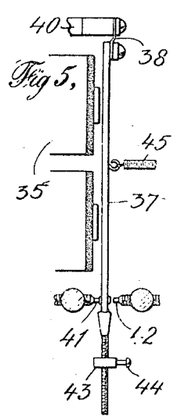
Fig. 5 is a detail diagrammatic elevation of a portion of this relay, showing the armature thereof in attracted position, the position in which the vibration hereinafter described takes place.
Figure 6:
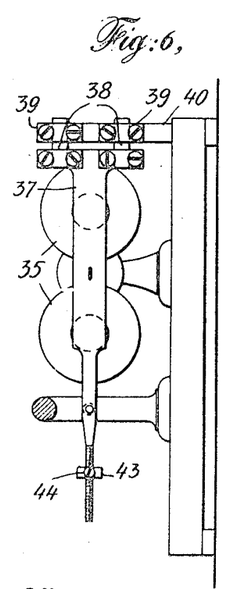
Fig. 6 shows a front elevation of said relay.
Figure 7:
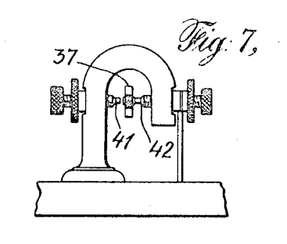
Fig. 7 shows a detail elevation of the yoke supporting the contact stops between which the armature plays.

In operation, and supposing an alternating current of definite frequency to be passing through the coils of the relay, and the weight on the armature lever to be in such position that said armature is tuned to that frequency, the armature will be against its front stop 41, as indicated in Fig. 5, and will vibrate about such stop as a nodal point. It has been found by experiment that the greatest motion of the armature is at its upper end, the flexible strips 38 permitting free motion of the end of the armature while at the same time supporting it. Since the stop 41 is at the nodal point of vibration, the contact formed by the armature with this stop is as perfect as in an ordinary direct current relay. The armature therefore responds to breaking and closing of the alternating current circuit in the same way as the armature of an ordinary neutral relay responds to the breaking and closing of a direct current circuit; and the armature of this alternating current relay does not leave its front stop during the intervals of no-magnetization incident to the passage of an alternating current through the coils of the relay magnet, as would the armature of an ordinary relay, but remains in contact with its stop during the intervals of current reversal, because this stop is at a node, and the periodic vibration of the armature is then more effective to keep the armature in contact with its stop than is the retractile spring 45 to pull the armature as a whole away from said stop. If, however, the alternating current passing through the magnet coils of the relay is of a frequency materially different from that frequency to which the armature is tuned, then although the armature may be attracted upon the closing of such alternating current circuit, and may be retracted upon the breaking of such circuit, the contact between the armature and the front stop 41, is not sufficiently good during closed circuit intervals, to pass current through such contact to a material extent; for in such case the node of vibration, if any, of the armature is not opposite the stop 41, and therefore said armature is continually closing and breaking contact with such stop, during the closed circuit intervals, the contact of closure being too brief to permit material rise of voltage while the contact exists. The relay shown is therefore in effect irresponsive to currents of frequencies other than that to which it is tuned, but completely responsive to currents of the frequency to which it is tuned.

Figure 8:
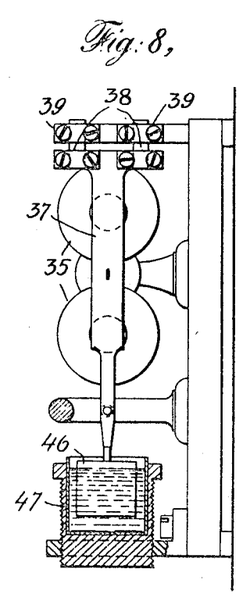
Fig. 8 shows a front elevation of an alternative form of relay.
Figure 9:
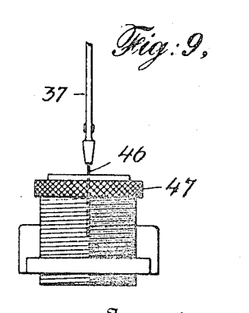
Fig. 9 is a detail side elevation of the lower portion of the armature, the paddle, and the liquid containing cup of that relay.

In Figs. 8 and 9 I illustrate an alternative form of this relay, similar in principle to the form shown in Figs. 4–7 inclusive, but having certain practical operative advantages. In this form, the armature instead of being provided with a tuning weight 43, is provided with a paddle 46 adapted to move backward and forward in fluid in a cup 47, this cup being adjustable vertically by means of screw threads, as shown, to vary the depth of immersion of the paddle and, consequently, to vary the resistance offered to the motion of the paddle. This construction has the advantage that the relay may be tuned to different frequencies while in operation and without checking the vibration of the armature. It is also found that this relay is somewhat easier to adjust than is the weight form of relay shown in Fig. 4—in other words, it has a somewhat greater working margin. This difference is probably due to the fact that the liquid interposes a "dead" resistance to the vibration of the armature, whereas the weight 43 of Fig. 4 interposes by contrast a "live" resistance to the motion of the armature.

Figure 2:
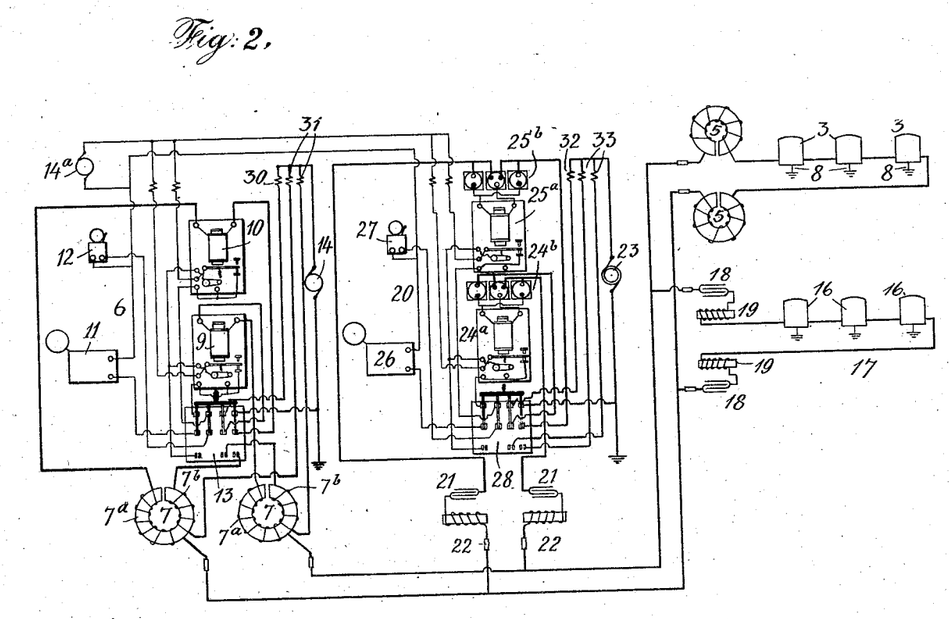
Fig. 2 illustrates an alternating system in general similar to that of Fig. 1 but employing rectifiers on the alternating current side in connection with the receiving relay of the alternating current side.

In the description of Fig. 1 it has been assumed that the receiving relays 24 and 25 of the alternating current system therein illustrated, are of a type specially adapted to work with alternating currents, and preferably the type illustrated in Figs. 4–9 inclusive. It is possible, however, in many cases, to use ordinary relays in the alternating current system, provided special means be employed to obviate the buzzing of the armatures against their contact stops owing to the intermittent action of the alternating current and constant change of polarity due to the constant reversals of such current. One method of adapting ordinary relays to use on the alternating current, is illustrated in Fig. 2, in which, in connection with each of the receiving relays, here numbered 24ª and 25ª, a current rectifier illustrated diagrammatically at 24ᵇ, and 25ᵇ, is employed. I do not limit myself to any particular type of rectifier but have found a three-cell electrolytic rectifier of well known type, indicated diagrammatically in Fig. 2, to be effective. Such rectifiers are well known and do not require detail description here. I have found it convenient in such rectifiers to use iron and aluminum electrodes and to use electrolyte composed of 1 part borax, 2 parts concentrated ammonia, 4 parts boric acid and 128 parts distilled water. At low frequency (up to 60 cycles per second) the maintenance of these rectifiers is not excessive and their performance is fairly constant. On higher frequencies, however, their maintenance cost becomes greater and their performance is not so satisfactory. Since for economy, in first cost of the apparatus, it is desirable to use a much higher frequency than 60 cycles, I do not ordinarily prefer to use the arrangement shown in Fig. 2, involving the use of the rectifiers. It will be understood that the effect of the rectifiers is to supply current of one direction to the relays 24ª and 25ª, notwithstanding that the current supplied to the rectifiers is an alternating current.

My invention is not limited to the use of a single alternating current or phantom system in connection with a direct current system of transmission, but there may be a plurality of alternating current systems, operating upon currents or different frequencies, and indeed, it is practicable to operate a large number of different alternating current systems over the same line wires, with or without a direct current system also transmitting over such wires.

Figure 3:
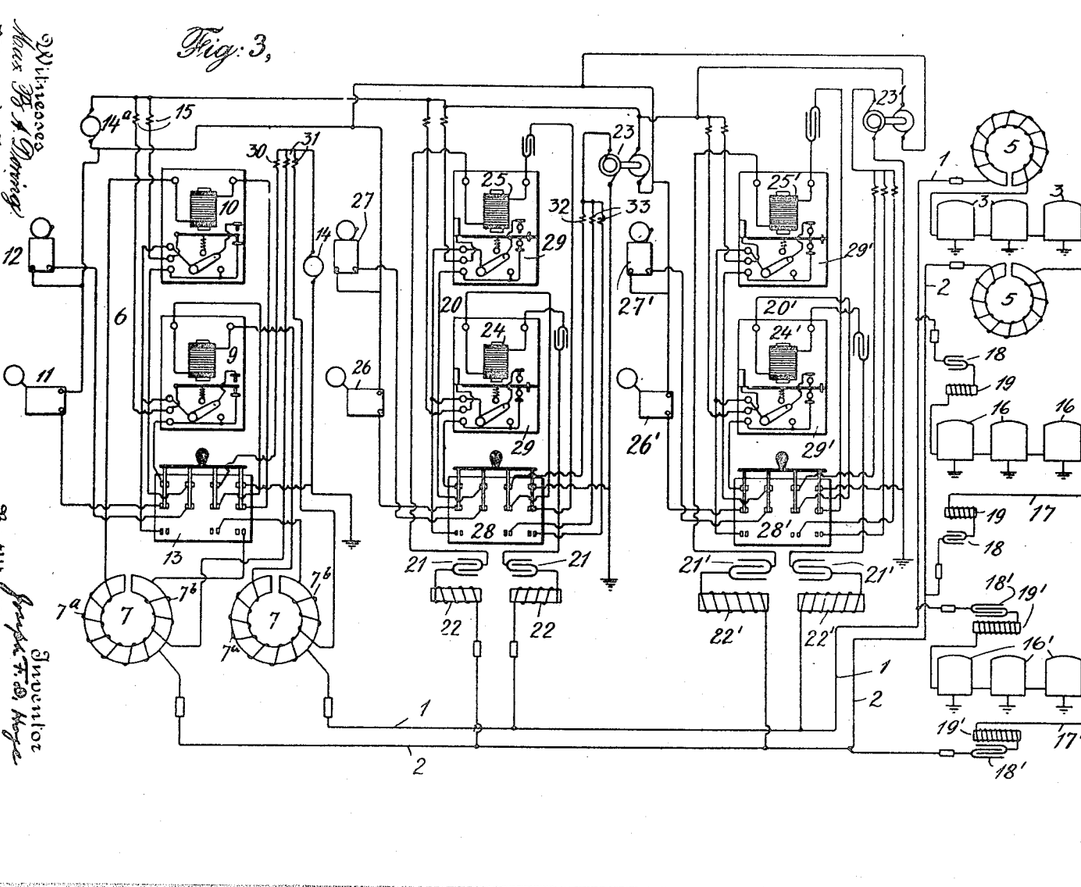
Fig. 3 is a view similar to Fig. 1, but illustrates the use of a plurality of alternating current sides on the same line conductors and in connection with a direct current side.
Figure 4:
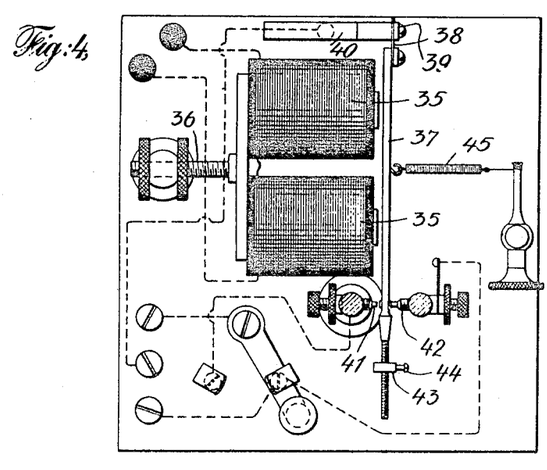
Fig. 4 shows a side elevation of a novel type of relay devised to operate on alternating currents.

In Fig. 3 I have illustrated a system similar to that shown in Fig. 1, except that there are two alternating current receiving and transmitting sets exactly similar to each other except that they work upon currents of different frequency. In this drawing the same reference numerals are used as in Fig. 1, except that the numbers of the second alternating current system are distinguished from the numbers of the first alternating current system by prime marks. Furthermore, my invention is not limited to use in district telegraph systems and the like, but may be employed in ordinary telegraphy.

Figure 10:
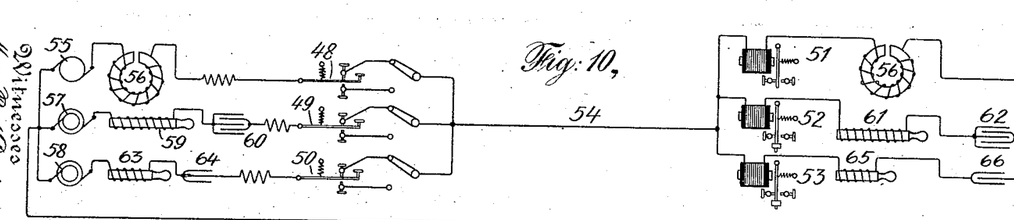
Fig. 10 is a diagram illustrating one application of my invention in ordinary telegraphy.

Fig. 10 shows a telegraph system comprising three transmitters, 48, 49 and 50, and three corresponding receiving relays 51, 52 and 53, operating over a single line circuit 54. Transmitter 48 and receiving relay 51 receive current from a direct current generator 55 and are isolated from the alternating currents of the other transmitters by inductive resistance 56. Transmitters 49 and 50 and their corresponding receiving relays 52 and 53, operate upon alternating current received from alternating current generators 57 and 58 respectively, such generators being of different frequencies. Inductive resistance 59 and a condenser 60 isolates the transmitter 49 from currents of frequencies other than that of generator 57, and in similar manner relay 52 is isolated by inductive resistance 61 and a condenser 62. Transmitter 50 is similarly isolated by inductive resistance 63 and a condenser 64, and its relay by inductive resistance 65 and a condenser 66. It will be seen that in this arrangement each transmitter and its corresponding receiving relay are connected to the line through isolating means which imposes relatively small resistance to the particular current upon which that transmitter and receiving relay operate, but imposes very great resistance to the currents upon which the other transmitters and receiving relays operate.

Figure 11:
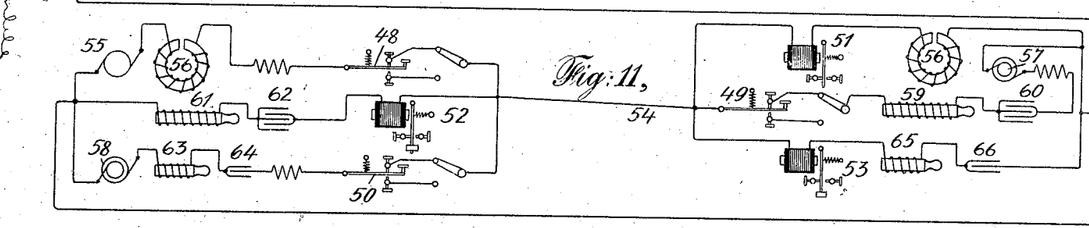
Figs. 11 and 12 are similar views illustrating other applications of my invention in ordinary telegraphy.

Fig. 11 shows an arrangement similar to that of Fig. 10, except that two of the transmitters are arranged to transmit in one direction, and a third transmitter to transmit in the opposite direction over the line circuit. It is immaterial whether all of the transmission systems of Figs. 10 and 11 transmit in the same direction or whether some transmit in one direction and some in the opposite direction.

Figure 12:
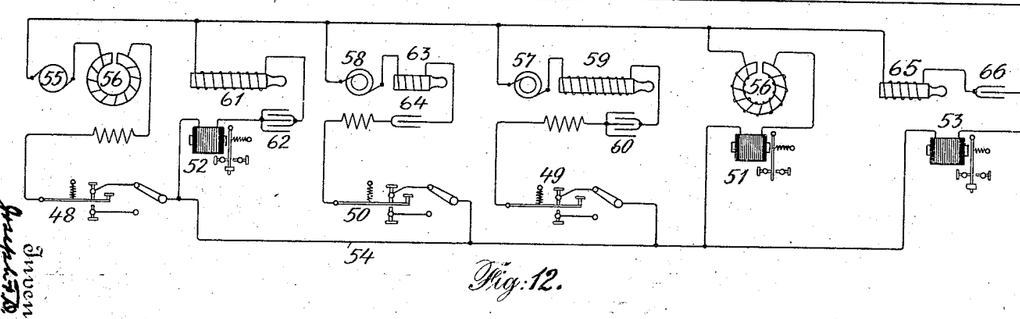

Fig. 12 illustrates an arrangement similar to those of Figs. 10 and 11, except that the various transmitters and receiving relays are located at different points along the line circuit.

Figure 13:
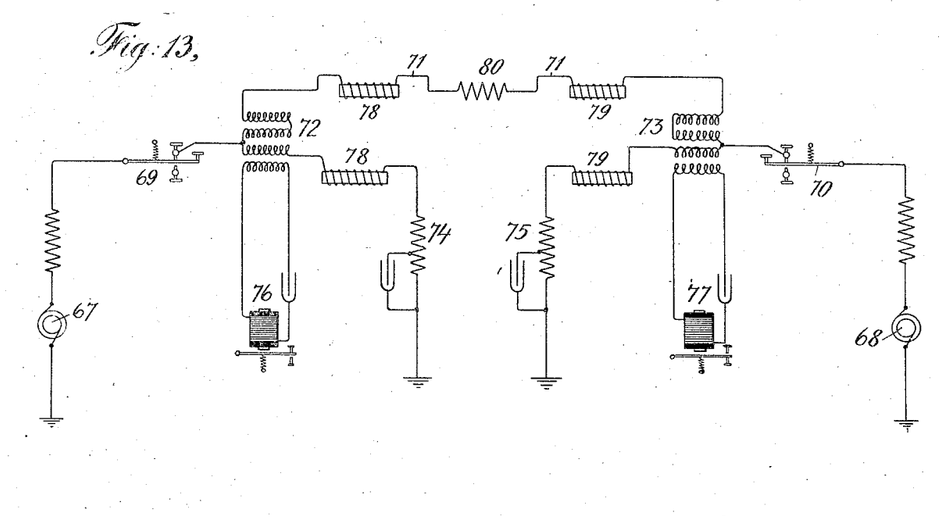
Fig. 13 is a diagram illustrating one method of duplexing alternating current systems such as herein described.

I may also duplex alternating current systems such as hereinbefore described, according to the well known systems of duplex telegraphy, so that transmitters using currents of the same frequency or character may be located at both ends of a line, the transmitter at either end of the line having no effect upon the receiving relay at that end of the line but affecting only the relay at the distant end of the line. One duplex circuit arrangement is shown in Fig. 13, wherein at the two ends of the line there are alternating current generators 67 and 68 respectively, and transmitters 69 and 70 respectively.

71 designates the line conductor, 72 and 73 designate repeating coils at the end of such line conductor and between the line conductor and the corresponding transmitter, 74 and 75 designate artificial lines, and 76 and 77 designate receiving relays inductively connected to the line circuit through the repeating coils 72 and 73. 78 and 79 designate, respectively, adjustable inductance coils in the stations at the two ends of the line for balancing the line inductively, and 80 designates line resistance. It will be obvious that the outgoing current at each end of the line divides, in passing through the repeating coil, 72 or 73, the currents in the two sides of such coil neutralizing each other so that there is no inductive effect upon the home relay, 76 or 77; but that at the distant end of the line the incoming currents pass through the line windings of the repeating coil in series, and so influence inductively the secondary windings of that coil and so influence the corresponding receiving relays 76 or 77.

While the alternating current generators 67 and 68 at the two ends of the line may be of the same frequency, they are not necessarily so, and if of the same frequency they need not operate synchronously.

The use, in systems above described embodying my invention, of sources of supply of alternating current adapted to supply current of substantially constant frequency, is an important feature of my system, because since the inductance and capacity of the alternating current circuits and the inductance of the direct current circuits is adjusted with respect to definite frequencies, material change in these frequencies beyond a certain limit, calls for readjustment of inductance and capacity, and if the source of current supply be one which gives different frequencies at different times, such readjustment is obviously impracticable. Moreover, the alternating current relays employed in the systems other than that shown in Fig. 2, themselves require for working that the current by which said relays are operated shall be of substantially constant frequency, for as stated, these relays do not make good contacts when they are not synchronized with respect to the current on which they are to be operated. I am aware that heretofore various systems of alternating current transmission have been superimposed upon direct current systems, the alternating currents in such cases having been obtained by means of induction coils and condensers, the transmitter closing and breaking the primary circuit of the induction coil and so producing in the secondary or line circuit a current pulse of one direction upon the closing of the primary circuit, and producing a current pulse of the opposite direction in the secondary circuit upon the breaking of the primary circuit. Obviously it is impracticable in such systems to obtain alternating currents of definite and constant frequencies, and therefore it is impracticable in such systems to proportion inductance and capacity with respect to a definite frequency.

What I claim is:—

1. A multiplex telegraph system comprising in combination a line conductor, a direct current generator, a constantly operating alternating current generator adapted to supply alternating current of definite and substantially constant frequency, a direct current transmitter, direct current receiving means, inductive resistance interposed between said direct current transmitting and receiving means and said conductor, and proportioned with reference to the alternating current to substantially exclude such alternating current from the direct current transmitting and receiving means, an alternating current transmitter and alternating current receiving means, and condensers and inductive resistances interposed between said alternating current transmitting and receiving means and said conductor, and proportioned with respect to the alternating current to pass said alternating current freely but to substantially exclude the influence of the direct current from the alternating current transmitting and receiving means, said alternating current transmitting and receiving means and alternating current generator and their corresponding condensers and inductive resistances, connected across the circuit comprising the said line conductor and the direct current transmitting and receiving means, generator and inductive resistances, said alternating current receiving means comprising a relay having a vibratory armature tuned to vibrate in harmony with the current reversals of the alternating current and arranged to coöperate with a contact located substantially at a nodal point of said armature when the latter is vibrating in harmony with such alternating current.

2. A multiplex telegraph system comprising in combination a line conductor, a plurality of constantly operating alternating current generators each adapted to supply alternating current of definite and substantially constant frequency, the frequencies of said generators being different with respect to one another, a corresponding plurality of alternating current transmitting and receiving means, and condensers and inductive resistance, each set of transmitting and receiving means proportioned to pass freely alternating current of the frequency pertaining to that transmitting and receiving means but to positively exclude alternating currents of different frequencies, each such receiving means comprising a relay having a vibratory armature tuned to vibrate in harmony with the corresponding alternating current and arranged to coöperate with a contact located substantially at a nodal point of said armature when the latter is vibrating in harmony with such alternating current.

3. A multiplex telegraph system comprising in combination a line conductor, a plurality of constantly operating alternating current generators each adapted to supply alternating current of definite and substantially constant frequency, the frequencies of said generators being different with respect to one another, a corresponding plurality of alternating current transmitting and receiving means, comprising condensers and inductive resistance, which are proportioned, for each set of transmitting and receiving means, to pass freely alternating current of the frequency pertaining to that transmitting and receiving means but to positively exclude alternating currents of different frequencies, each such receiving means comprising a relay having a vibratory armature tuned to vibrate in harmony with the corresponding alternating current and arranged to coöperate with a contact located substantially at a nodal point of said armature when the latter is vibrating in harmony with such alternating current.

4. A multiplex telegraph system comprising in combination a line conductor, a plurality of alternating current generators of different frequencies respectively, each adapted to supply alternating current of a definite and substantially constant frequency, a plurality of alternating current transmitting and receiving means, a condenser and inductive resistance interposed between each such transmitting means and said conductor, and proportioned with reference to the alternating current frequency corresponding to that transmitter and receiver to pass freely alternating current of that frequency, but to substantially exclude alternating currents of different frequency, and a condenser and inductive resistance interposed between each receiving means and said conductor and proportioned with reference to the alternating current to which that receiving means is to respond, to pass freely alternating current of the corresponding frequencies but to substantially exclude alternating currents of different frequencies, each such receiving means comprising a relay having a vibratory armature tuned to vibrate in harmony with the alternating current of the corresponding frequency and arranged to coöperate with a contact located substantially at a nodal point of said armature when the latter is vibrating in harmony with its corresponding alternating current.

5. A multiplex telegraph system comprising in combination a direct current signaling system and an alternating current signaling system, said two systems comprising a common line conductor, the alternating current system comprising a source of supply of alternating current of definite and substantially constant frequency, and comprising also isolating means proportioned to substantially isolate such alternating current system from the direct current, but to transmit the alternating current freely, the direct current system comprising a source of supply of direct current and isolating means proportioned to substantially isolate such direct current system from the alternating current, both the direct system and the alternating current system comprising large ohmic resistance proportioned to make the line impedance due to resistance, the controlling factor of the total line impedance.

6. A multiplex telegraph system comprising in combination a direct current signaling system and an alternating current signaling system, both said systems being normally metallic circuit systems and comprising the same line conductors, the alternating current system comprising a source of supply of alternating current of definite and substantially constant frequency, and comprising also isolating means proportioned to substantially isolate such alternating current system from the direct current, but to transmit the alternating current freely, the direct current system comprising a source of supply of direct current and isolating means proportioned to substantially isolate such direct current system from the alternating current, both the direct current system and the alternating current system adapted for McCulloh operation and comprising line McCulloh switches whereby either such system may be converted into two independent systems, and comprising also separate receiving means for each such independent system, such direct current system further comprising a large ohmic resistance included in circuit by the McCulloh switch when that system is operated as a metallic return system, and further comprising other ohmic resistances arranged to be included in the independent circuits by said McCulloh switch during McCulloh operation, such further resistances of value adapted to compensate for the absence in each of the independent systems during McCulloh operation of one of the two receiving means included in the circuit during normal or metallic-circuit operation.

7. A multiplex telegraph system comprising in combination a direct current signaling system and an alternating current signaling system, both said systems being normally metallic circuit systems and comprising the same line conductors, the alternating current system comprising a source of supply of alternating current of definite and substantially constant frequency, and comprising also isolating means proportioned to substantially isolate such alternating current system from the direct current, but to transmit the alternating current freely, the direct current system comprising a source of supply of direct current and isolating means proportioned to substantially isolate such direct current system from the alternating current, both the direct current system and the alternating current system adapted for McCulloh operation and comprising line McCulloh switches whereby either such system may be converted into two independent systems, and comprising also separate receiving means for each such independent system, such alternating current system further comprising a large ohmic resistance included in circuit by the McCulloh switch when that system is operated as a metallic return system, and further comprising other ohmic resistances arranged to be included in the independent circuits by said McCulloh switch during McCulloh operation, such further resistances of value adapted to compensate for the absence in each of the independent systems during McCulloh operation of one of the two receiving means included in the circuit during normal or metallic-circuit operation.

8. A multiplex telegraph system comprising in combination two alternating current signaling systems, both said systems being normally metallic circuit systems and comprising the same line conductors, the two systems comprising each a source of supply of alternating current of definite and substantially constant frequency, but of frequency different from that of the other system, and comprising also isolating means proportioned to substantially isolate such system from current of the frequency of the other system, but to transmit its own alternating current freely, both said systems adapted for McCulloh operation, and comprising line McCulloh switches whereby either such system may be converted into two independent systems, and comprising also separate receiving means for each such independent system, each such system further comprising a large ohmic resistance included in circuit by its McCulloh switch when that system is operated as a metallic return system, and further comprising other ohmic resistances arranged to be included in the independent circuits by said McCulloh switch during McCulloh operation, such further resistances of value adapted to compensate for the absence in each of the independent systems during McCulloh operation of one of the two receiving means included in the circuit during normal or metallic-circuit operation.

9. A multiplex telegraph system comprising in combination a direct current signaling system and an alternating current signaling system, both said systems being normally metallic circuit systems, and comprising the same line conductors, the alternating current system comprising a source of supply of alternating current of definite and substantially constant frequency, and comprising also isolating means proportioned to substantially isolate such alternating current system from the direct current, but to transmit the alternating current freely, the direct current system comprising a source of supply of direct current, both the direct current system and the alternating current system adapted for McCulloh operation, and comprising line McCulloh switches whereby either such system may be converted into two independent systems, and comprising also separate receiving means for each such independent system, such direct current system further comprising inductive resistances controlled by the direct current McCulloh switch and arranged to be included in the metallic circuit during normal operation and in each independent circuit during McCulloh operation, and comprising further inductive resistances likewise controlled by the McCulloh switch and arranged to be included in the independent circuits during McCulloh operation, such additional inductive resistance proportioned to compensate for the absence in each of the independent circuits during McCulloh operation of the inductance of one of the two receiving means included in the circuit during normal or metallic circuit operation, the said inductive resistances on the direct current system proportioned to substantially isolate such direct current system from the alternating current, both during normal and during McCulloh operation.

10. A multiplex telegraph system, comprising in combination a line conductor, a plurality of source of supply of alternating current of different frequencies respectively, isolating means for each such source of supply, proportioned to the corresponding current frequencies to pass current of that frequency but to exclude currents of other frequencies, and a plurality of synchronized receiving instruments each corresponding to one of the current frequencies of the system, and synchronized to respond to current of that frequency, and isolating means for each such receiving instrument proportioned to the corresponding current frequency but to exclude currents of other frequencies.

11. A multiplex telegraph system comprising a plurality of alternating current systems, operating on different frequencies, over the same line circuit and each having transmitting and receiving means located in line shunts proportioned as to inductance and capacity to pass currents of the corresponding frequency, but to exclude currents of other frequencies, said receiving means each synchronized to respond effective to currents of its corresponding frequency only.

In testimony whereof, I affix my signature, in the presence of two witnesses.

JOSEPH F. D. HOGE.

Witnesses:
M. M. THORP,
CHARLES F. PATTERSON.